United States Patent
Harrington et al.

(10) Patent No.: US 11,901,934 B2
(45) Date of Patent: Feb. 13, 2024

(54) MOCA FREQUENCY HOPPING VSAT (71) Applicant: HUGHES NETWORK SYSTEMS, LLC, Germantown, MD (US)

(72) Inventors: Emanuel Harrington, Germantown, MD (US); Lekha Panneer Selvam, Germantown, MD (US); Yong Kang Yuan, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 260 days.

(21) Appl. No.: 17/566,551

(22) Filed: Dec. 30, 2021

(65) Prior Publication Data

US 2023/0216537 A1  Jul. 6, 2023

(51) Int. Cl.
*H04B 1/7136* (2011.01)
*H04L 43/0823* (2022.01)

(52) U.S. Cl.
CPC ....... *H04B 1/7136* (2013.01); *H04L 43/0823* (2013.01); *H04B 2001/71362* (2013.01)

(58) Field of Classification Search
CPC ........ H04B 1/7136; H04B 2001/71362; H04L 43/0823; H04L 5/001; H04L 43/0847; H04L 43/08; H04L 43/16; H04L 43/022; H04L 43/024; H04L 43/50; H04L 43/55
See application file for complete search history.

(56) References Cited

U.S. PATENT DOCUMENTS

2021/0127404 A1\* 4/2021 Ryu ............... H04W 80/02
2022/0086839 A1\* 3/2022 Abotabl ........... H04W 72/0453

\* cited by examiner

*Primary Examiner* — Khanh C Tran
(74) *Attorney, Agent, or Firm* — Potomac Technology Law, LLC (57) ABSTRACT

An apparatus and method for hopping across frequencies in a transmission medium. A communication link is established between multiple devices over a communication medium using a default frequency resource. Signaling information is detected for frequency resources available on the communication medium, and values associated with the signaling information are stored within a logging table. The communication link is monitored for errors and a new frequency resource is selected from the logging table to maintain the communication link, if the errors exceed a predetermined threshold.

20 Claims, 11 Drawing Sheets

| MoCA Band | MoCA Channel | Channel Center Frequency | SNR (dB) |
|---|---|---|---|
| A | A1 | 875 MHz | 20 |
|  |  |  |  |
| B | B1 | 900 MHz | 30 |
|  |  |  |  |
|  | C1 | 925 MHz | 25 |
| C | C2 | 950 MHz | 10 |
|  | C3 | 975 MHz | 15 |
|  | C4 | 1000 MHz | 18 |
|  |  |  |  |
|  | D1 | 1150 MHz | 10 |
|  | D2 | 1200 MHz | 15 |
|  | D3 (active) | 1250 MHz | 18 |
| D | D4 | 1300 MHz | 25 |
|  | D5 | 1350 MHz | 45 |
|  | D6 | 1400 MHz | 35 |
|  | D7 | 1450 MHz | 22 |
|  | D8 | 1500 MHz | 30 |
|  |  |  |  |
|  | E1 | 500 MHz | 33 |
|  | E2 | 525 MHz | 21 |
| E | E3 | 550 MHz | 36 |
|  | E4 | 575 MHz | 12 |
|  | E5 | 600 MHz | 8 |
|  |  |  |  |
|  | F1 | 675 MHz | 10 |
|  | F2 | 700 MHz | 16 |
|  | F3 | 725 MHz | 22 |
| F | F4 | 750 MHz | 24 |
|  | F5 | 775 MHz | 21 |
|  | F6 | 800 MHz | 18 |
|  | F7 | 825 MHz | 27 |
|  | F8 | 850 MHz | 32 |

410 → D3 (active)
412 → D5
414 → E3

Fig. 4

| A-Band (850 MHz to 900 MHz) | Frequency | SNR (dB) |
|---|---|---|
| Segment_1 ← 512 | 850 to 865 | 45 |
| Segment_2 (active) ← 510 | 865 to 870 | 35 |
| Segment_3 | 870 to 890 | 15 |
| Segment_4 | 890 to 900 | 18 |

MOCA FREQUENCY HOPPING VSAT

BACKGROUND INFORMATION

Consumers are continually increasing their use of technological devices. Smart devices and appliances are often found throughout many homes. Consumers often own, for example, personal devices such as smartphones, tablets, and laptops. In addition, consumers will often incorporate an internet of things (IoT) that include televisions, home assistants, thermostats, refrigerators, ovens, etc. Many consumers also subscribe to service from content providers, (e.g., cable, satellite, video/audio streaming) which deliver live programming and/or on-demand programming. All of these technological devices require connections to local (home) or external networks (internet).

Television and internet services are typically delivered to a residence using various types of standard wiring as the physical media. In the case of satellite services, an external dish (i.e., antenna) is used to receive signals from a satellite and wires/cables are used to direct the received signals inside the residence. In the case of internet and cable services, wires and cables supply the necessary signals inside the residence from an external source. Consumers often utilize different service providers which may share the same physical media for transmitting service specific signals. Consumers can also use the same physical media for connecting different video components. For example, a household can be prewired with coaxial cable, which is ultimately used for satellite services from one provider, internet services from another provider, and broadcast television services. Simultaneous transmission of these signals on the same physical media can often result in interference from the different services. In order to avoid and/or minimize such interference, various service providers have begun to use specific frequency bands in the MoCA frequency range like D-band, E-band, and F-band.

Not all service providers, however, utilize specific MoCA frequency bands. Furthermore, multiple service providers may operate on the same MoCA frequency band. When multiple service providers operate on the same frequency band, or the entire frequency spectrum of the transmission medium, the resulting interference can cause signal degradation for one or more of the other services. The signal degradation can potentially continue to increase as a consumer adds to the number of services in the residence or incorporates personal video components that also utilize the same transmission medium (e.g., coax cable).

BRIEF SUMMARY

An apparatus and method are disclosed for hopping across frequencies in a transmission medium. According to an embodiment, the apparatus includes a memory for storing information, including one or more instructions; and one or more processors for executing the one or more instructions. The apparatus also includes a frequency hopping circuit for: establishing a communication link, between the apparatus and one or more additional devices, over a communication medium using a default frequency resource; detecting signaling information for frequency resources available on the communication medium; storing values associated with the signaling information as entries within a logging table configured to store, in part, information regarding available resources on the communication medium; monitoring errors in the communication link; selecting a new frequency resource from the logging table, if the errors exceed a predetermined threshold level; supplying the new frequency resource to the one or more additional devices; and maintaining the communication link using the new frequency resource.

According to another embodiment, a method includes: establishing a communication link, between a first device and one or more additional devices, over a communication medium using a default frequency resource; detecting signaling information for frequency resources available on the communication medium; storing values associated with the signaling information as entries within a logging table configured to store, in part, information regarding available resources on the communication medium; monitoring errors in the communication link; selecting a new frequency resource from the logging table, if the errors exceed a predetermined threshold level; supplying the new frequency resource to the one or more additional devices; and maintaining the communication link using the new frequency resource.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

An apparatus and method for hopping across frequencies in a transmission medium are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
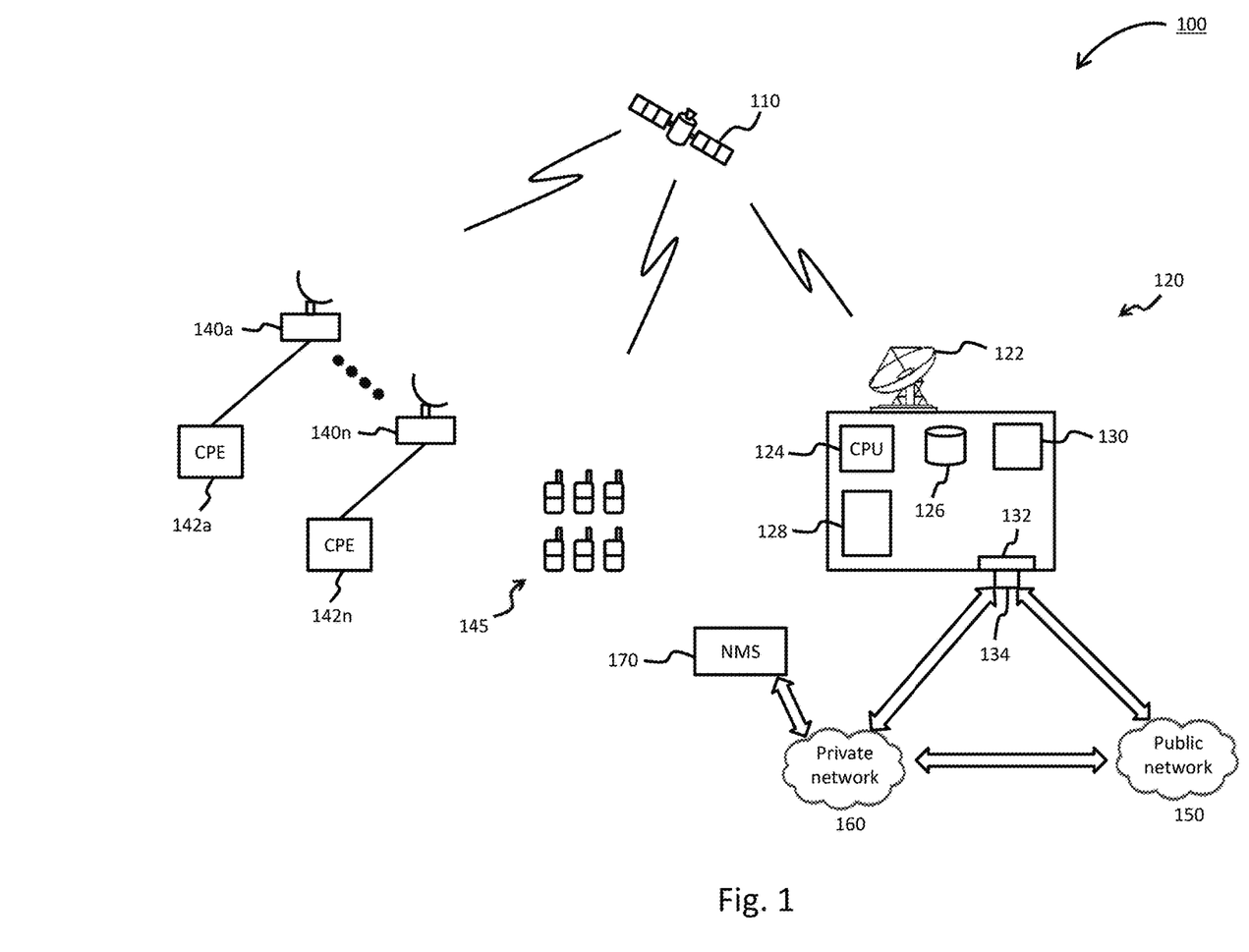
FIG. 1 is a diagram of a system capable of providing voice and data services, according to at least one embodiment.

FIG. 1 illustrates a satellite communication system 100 capable of providing voice and data services. The satellite communication system 100 includes a satellite 110 that supports communications among a number of gateways 120 (only one shown) and multiple stationary satellite terminals 140a-140n. Each satellite terminal (or terminal) 140 can be configured for relaying traffic between its customer premise equipment (CPEs) 142a-142n (i.e., user equipment), a public network 150 such as the internet, and/or its private network 160. Depending on the specific embodiment, the customer premise equipment 142 can be a desktop computer, laptop, tablet, cell phone, etc. Customer premise equipment 142 can also be in the form of connected appliances that incorporate embedded circuitry for network communication which can also be supported by the satellite terminal (or terminal) 140. Connected appliances can include, without limitation, televisions, home assistants, thermostats, refrigerators, ovens, etc. The network of such devices is commonly referred to as the internet of things (IoT).

According to an exemplary embodiment, the terminals 140 can be in the form of very small aperture terminals (VSATs) that are mounted on a structure, habitat, etc. Depending on the specific application, however, the terminal 140 can incorporate an antenna dish of different sizes (e.g., small, medium, large, etc.). The terminals 140 typically remain in the same location once mounted, unless otherwise removed from the mounting. According to various embodiments, the terminals 140 can be mounted on mobile platforms that facilitate transportation thereof from one location to another. Such mobile platforms can include, for example, cars, buses, boats, planes, etc. The terminals 140 can further be in the form of transportable terminals capable of being transported from one location to another. Such transportable terminals are operational only after arriving at a particular destination, and not while being transported.

As illustrated in FIG. 1, the satellite communication system 100 can also include a plurality of mobile terminals 145 that are capable of being transported to different locations by a user. In contrast to transportable terminals, the mobile terminals 145 remain operational while users travel from one location to another. The terms user terminal, satellite terminal, terminal may be used interchangeably herein to identify any of the foregoing types. The gateway 120 can be configured to route traffic from stationary, transportable, and mobile terminals (collectively terminals 140) across the public network 150 and private network 160 as appropriate. The gateway 120 can be further configured to route traffic from the public network 150 and private network 160 across the satellite link to the appropriate terminal 140. The terminal 140 then routes the traffic to the appropriate customer premise equipment (CPE) 142.

According to at least one embodiment, the gateway 120 can include various components, implemented in hardware, software, or a combination thereof, to facilitate communication between the terminals 140 and external networks 150, 160 via the satellite 110. According to an embodiment, the gateway 120 can include a radio frequency transceiver 122 (RFT), a processing unit 124 (or computer, CPU, etc.), and a data storage unit 126 (or storage unit). While generically illustrated, the processing 124 can encompass various configurations including, without limitations, a personal computer, laptop, server, etc. As used herein, a transceiver corresponds to any type of antenna unit used to transmit and receive signals, a transmitter, a receiver, etc. The RFT 122 is useable to transmit and receive signals within a communication system such as the satellite communication system 100 illustrated in FIG. 1. The data storage unit 126 can be used, for example, to store and provide access to information pertaining to various operations in the satellite communication system 100. Depending on the specific implementation, the data storage unit 126 (or storage unit) can be configured as a single drive, multiple drives, an array of drives configured to operate as a single drive, etc.

According to other embodiments, the gateway 120 can include multiple processing units 124 and multiple data storage units 126 in order to accommodate the needs of a particular system implementation. Although not illustrated in FIG. 1, the gateway 120 can also include one or more workstations 125 (e.g., computers, laptops, etc.) in place of, or in addition to, the one or more processing units 124. Various embodiments further provide for redundant paths for components of the gateway 120. The redundant paths can be associated with backup components capable of being seamlessly or quickly switched in the event of a failure or critical fault of the primary component.

According to the illustrated embodiment, the gateway 120 includes baseband components 128 which operate to process signals being transmitted to, and received from, the satellite 110. For example, the baseband components 128 can incorporate one or more modulator/demodulator units, system timing equipment, switching devices, etc. The modulator/demodulator units can be used to generate carriers that are transmitted into each spot beam and to process signals received from the terminals 140. The system timing equipment can be used to distribute timing information for synchronizing transmissions from the terminals 140.

According to an embodiment, a fault management unit 130 can be included in the gateway 120 to monitor activities and output one or more alerts in the event of a malfunction in any of the gateway components. The fault management unit 130 can include, for example, one or more sensors and interfaces that connect to different components of the gateway 120. The fault management unit 130 can also be configured to output alerts based on instructions received from a remotely located network management system 170 (NMS). The NMS 170 maintains, in part, information (configuration, processing, management, etc.) for the gateway 120, and all terminals 140 and beams supported by the gateway 120. The gateway 120 can further include a network interface 132, such as one or more edge routers, for establishing connections with a terrestrial connection point 134 from a service provider. Depending on the specific implementation, however, multiple terrestrial connection points 134 may be utilized.

Figure 2:
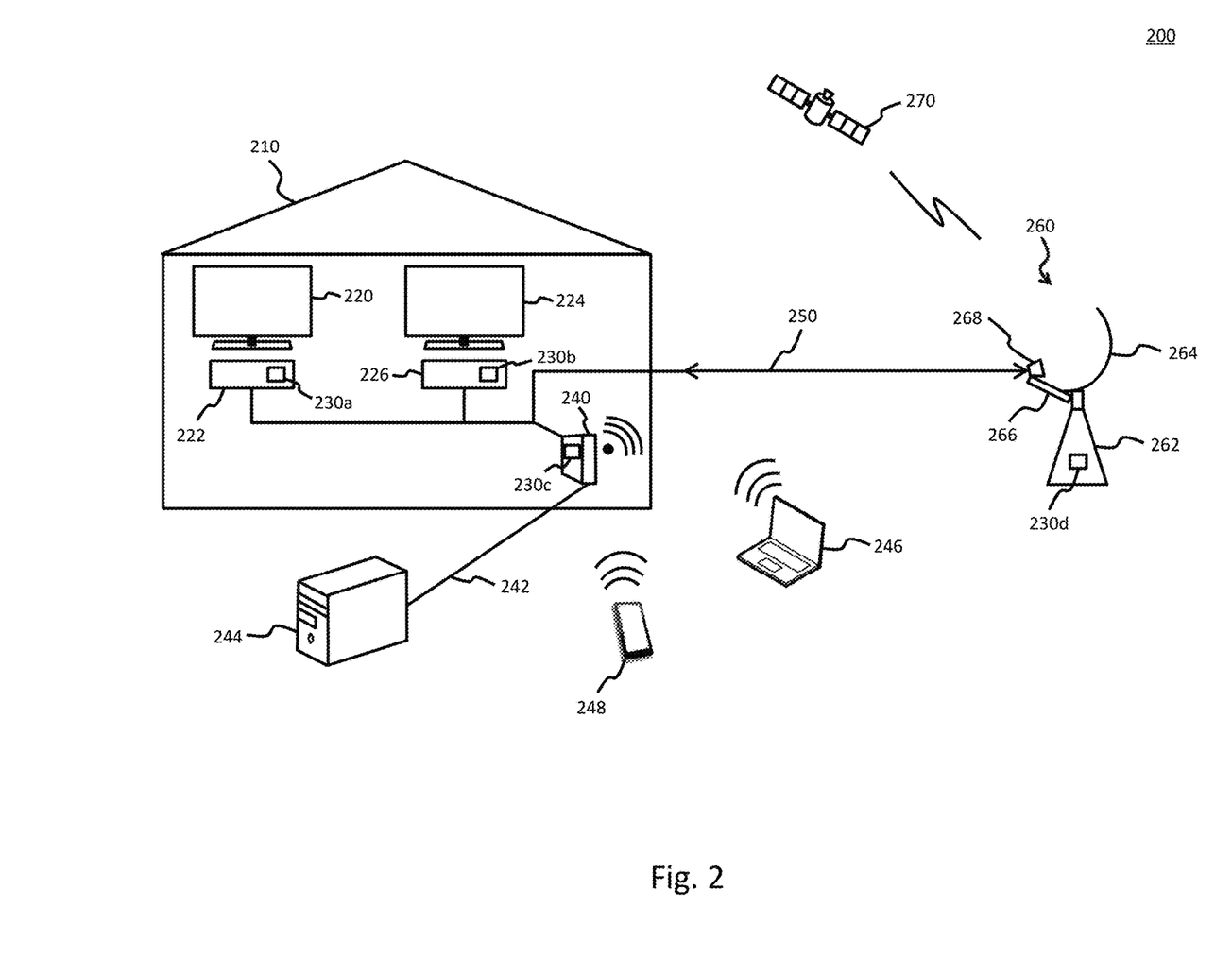
FIG. 2 is a diagram of a system for providing frequency hopping techniques within a communication medium, in accordance with one or more embodiments.

FIG. 2 illustrates a system 200 for hopping across operational frequencies within a communication medium, in accordance with one or more embodiments. The system 200 includes a satellite terminal (e.g., VSAT) associated with a dwelling 210, such as a home or office, in order to provided voice and data services to customers. According to the embodiment illustrated in FIG. 2, the satellite terminal can include multiple indoor units (222, 226, 240), and an outdoor unit 260 for transmitting/receiving data to/from a communication satellite 270. The indoor units can be in the form of various components including, for example, a first satellite receiver 222 for supplying television programming to a first television 220, a second satellite receiver 226 for supplying television programming to a second television 224, a satellite modem 240 for supplying voice and data services, etc. As illustrated in FIG. 2, the satellite modem 240 can establish a wired communication link with a personal computer, a wireless communication link with a laptop computer 246, and a wireless communication link with a tablet 248.

According to at least one embodiment, each indoor unit can include a frequency hopping circuit capable of selecting the best frequency within the communication medium to establish and maintain a communication link. For example, the first satellite receiver 222 includes frequency hopping circuit 230a, the second satellite receiver 224 includes frequency hopping circuit 230b, and the satellite modem 240 includes frequency hopping circuit 230c. According to various embodiments, the frequency hopping circuits 230 are capable of dynamically identifying different frequencies within a transmission medium which can provide better operating conditions.

For example, a transmission medium such as coaxial cable can operate under Multimedia over Coax Alliance (MoCA) standards that utilize predefined channels operating on specific frequency bands. Interference can often result from the presence of other multimedia components operating on the same frequency band (or channel) as the default band/channel for the system 200 (or satellite network), or the addition of such components. Furthermore, certain long term evolution (LTE) bands can cause interference within the default band/channel used by the system 200, for example, during initial deployment. The frequency hopping circuits 230 are capable of independently, or cooperatively, monitoring conditions on the transmission medium, and selecting the optimal channel and/or band (for MoCA standards) for communicating. Depending on the specific implementation, the frequency hopping circuits 230 can hop across different frequency bands or within different channels of a particular frequency band in order to select the best operating conditions.

The frequency hopping circuits 230 can also independently define different frequency segments that can be used for communicating. In the case of predefined MoCA standards, the frequency hopping circuits 230 can define specific frequency segments within a particular band or channel. If other communication media are used, the frequency hopping circuits 230 can define frequency segments corresponding to a portion, or entire, bandwidth available on the communication medium. According to at least one embodiment, frequency changes may only be allowed if signal conditions are below (or exceed) certain thresholds or predetermined ranges, thereby preventing frequency hopping for minimal improvements in signal quality. Upon identifying a channel, band, or frequency segment capable of providing improved signal quality, information can be shared with all frequency hopping circuits 230 in order to maintain the communication link using the newly identified channel, band, frequency segment, etc.

The outdoor unit 260 can include, for example, a base 262 for mounting an antenna dish 264. The outdoor unit 260 also includes a feed arm 266 which extends from the base 262. A transceiver such as an IPRadio 268 is subsequently mounted at the end of the feed arm 266 such that it faces the antenna dish 264. The IPRadio 268 can be configured to incorporate a receiver unit such as an LNB and a transmitter unit. The receiver unit would receive and amplify outroute signals received from the satellite 270. The receiver unit also down-converts the frequency signals used by the satellite (e.g., Ku, Ka, C-band, etc.) to signals appropriate for transmission over an interfacility links (IFL) cable 250. The transmitter unit receives signals over the IFL cable and up-converts them to frequency signals appropriate for transmission to the satellite 270. Various embodiments, however, can include an IPRadio 268 configured only to perform transmit functions, and a separate LNB to perform receive functions. According to the embodiment illustrated in FIG. 2, the outdoor unit 260 also includes a frequency hopping circuit 230d which is capable of selecting, and operating within, specific frequencies of the transmission medium. According to one or more embodiments, the outdoor unit 260 connects to the satellite receivers 222, 226 (or set top boxes) and the satellite modem 240 using the interfacility links (IFL) cable 250 as the transmission medium. In such embodiments, the frequency hopping circuits 230 can define specific frequency segments that can be used to communicate. According to other embodiments MoCA standards can be applied.

Figure 3:
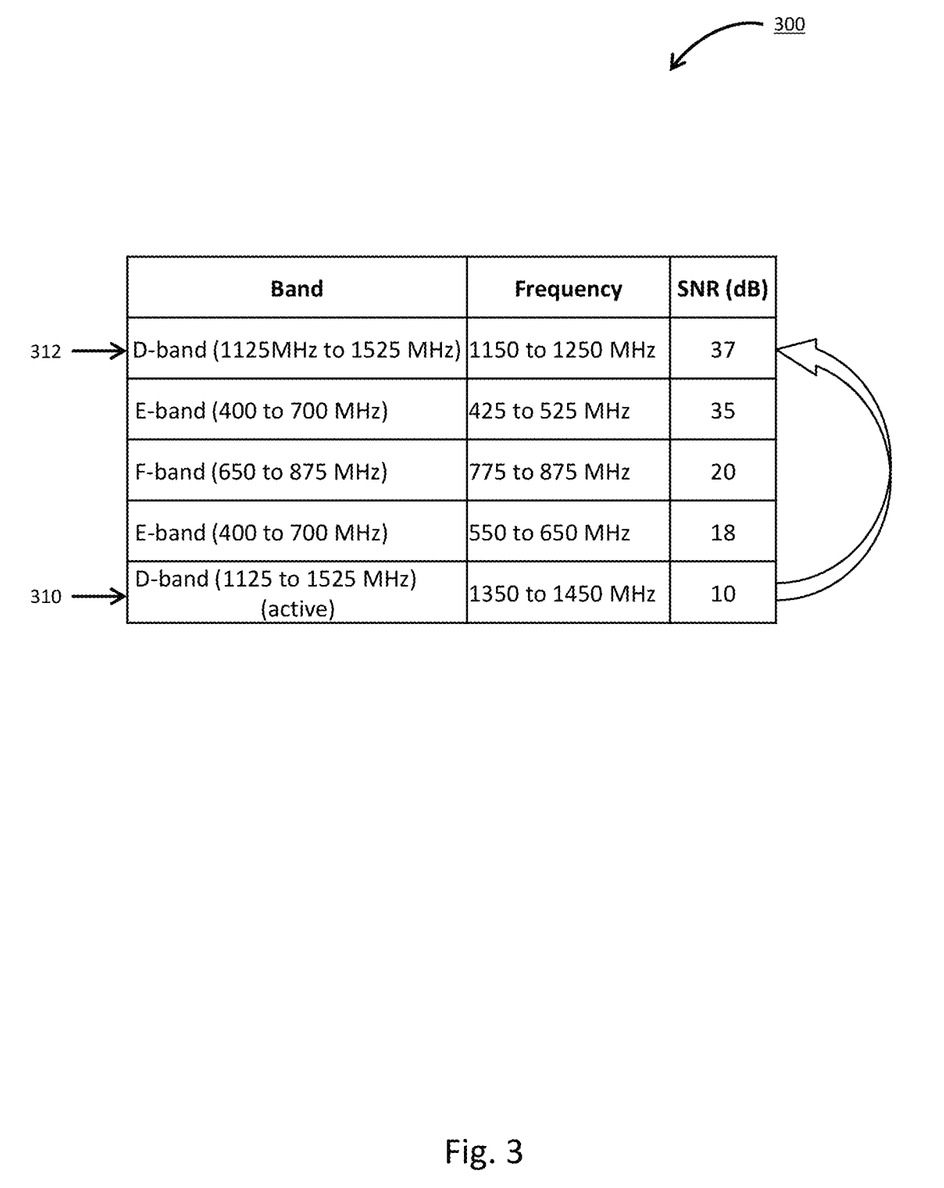
FIG. 3 illustrates an exemplary table that can be used in connection with frequency hopping, according to one embodiment.

FIG. 3 illustrates a logging table 300 that can be created by the frequency hopping circuits 230. According to the illustrated embodiment, the system is configured to monitor the various portions of multiple frequency bands in order to identify the best frequency resource for maintaining a communication link. The table 300 includes 5 entries. Each entry includes a band that is defined for the transmission medium, a frequency range (or resource) associated with the band, and a signal-to-noise ratio associated with the frequency resource. If the transmission medium is a coaxial cable which complies with MoCA standards, for example, then the bands can represent specific MoCA bands. The frequency ranges would then correspond to a portion of the MoCA band or the entire range defined by the particular MoCA band. According to the illustrated embodiment, entry 310 corresponds to the frequency resource currently being used to transmit signals over the established communication link. The frequency resource ranges from 1350 MHz to 1450 MHz. Thus, the frequency resource corresponds to a portion of the total frequency bandwidth of the MoCA D band. The signal-to-noise ratio for entry 310 is currently determined to be 10 dB.

According to the illustrated embodiment, this is the lowest signal-to-noise ratio value across all the available frequency resources being used by the system. Upon examining the table 300, the frequency hopping circuit would determine that entry 312 should be used to maintain the communication link. The frequency hopping circuit would then send the frequency resource defined by entry 312 to all other devices utilizing the communication link. The frequency hopping circuit would also inform the devices that communication will be moved to the frequency resource defined by entry 312. At this point, communication would be maintained using the new frequency resource contained in entry 312. According to one or more embodiments, upon identifying a new entry within the table 300, the frequency hopping circuit can determine a waiting period to allow all devices to synchronize prior to initiating communication using the newly selected frequency resource. Alternatively, the frequency hopping circuit can designate a specific time, based on a common clock, to initiate the change. According to other embodiments, communication may be provided redundantly on both frequency resources until confirmation is received that all devices have switched to the new frequency resource.

Figure 4:
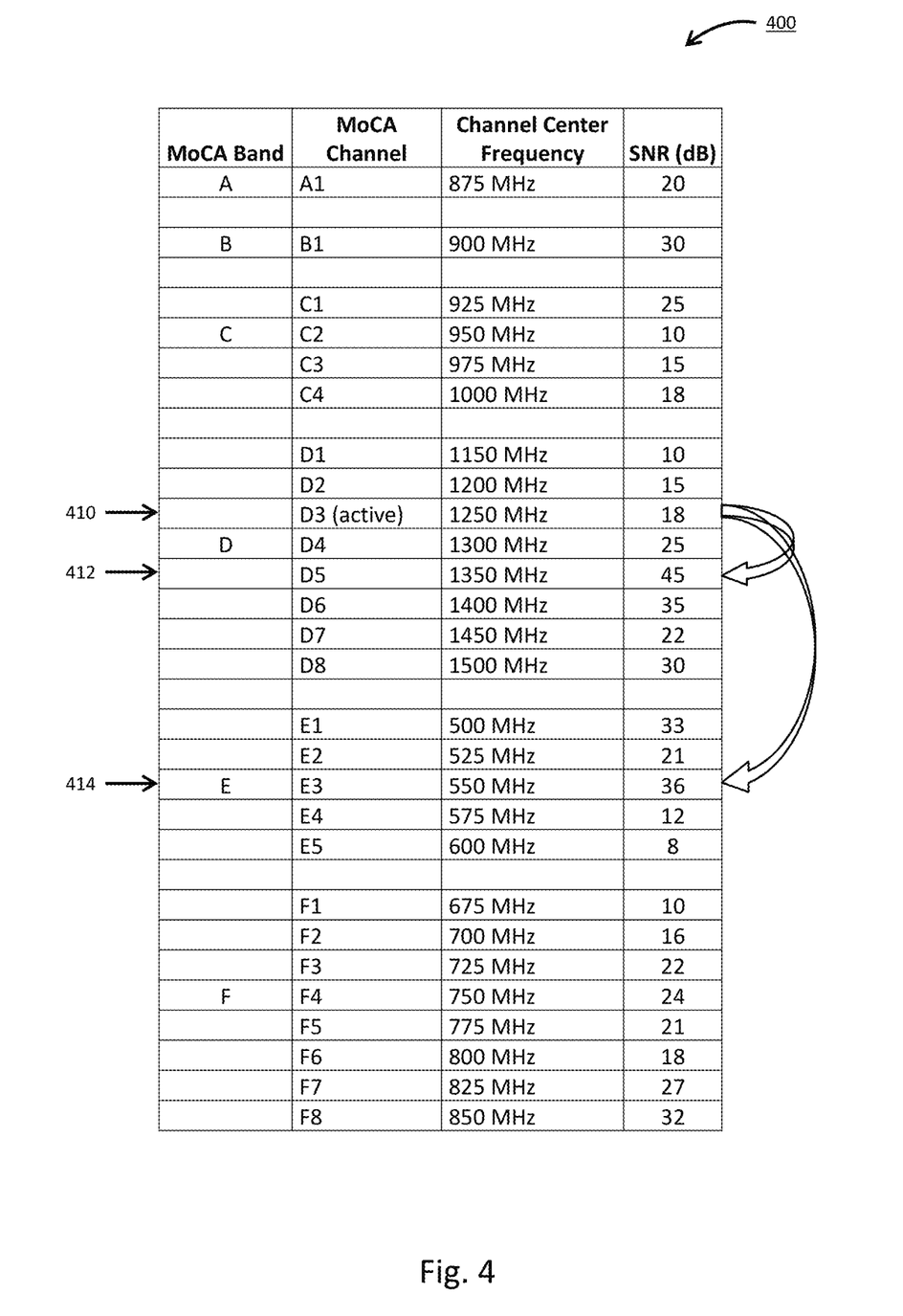
FIG. 4 is a table for illustrating frequency hopping within a frequency band or across different frequency bands, according to one embodiment.

FIG. 4 illustrates another logging table 400 that can be created by the frequency hopping circuits 230. According to the illustrated embodiment, the table 400 has been created for a transmission medium such as a coaxial cable which complies with MoCA standards. Accordingly, the table 400 includes entries for specific MoCA bands, MoCA channels, and the center frequencies associated with each MoCA channel. The table 400 further includes the signal-to-noise ratio determined for each MoCA channel being monitored. As previously discussed, the frequency hopping circuit can monitor all available frequencies and measure the signal-to-noise ratio for each frequency. According to at least one embodiment, the frequency hopping circuit can be configured to monitor only MoCA channels that are currently active, or contain signaling information. Thus, if there are no other systems which share the coaxial cable or such systems are inactive, MoCA bands and channels associated with such systems can be excluded from the table 400. According to other embodiments, the table 400 can include information pertaining to all MoCA bands and MoCA channels available. If a different transmission medium is utilized, the table can include all standard bands and channels for such transmission medium, or information pertaining to the entire frequency bandwidth usable within the transmission medium.

According to the illustrated embodiment, entry 410 corresponds to the MoCA channel (or frequency resource) currently being used between devices for the communication link. According to one embodiment, the frequency hopping circuit can be configured to select frequency resources within a particular MoCA band, or frequency resources within a different MoCA band. For example, the frequency hopping circuit can examine all of the MoCA channels associated with MoCA band D, and determine that entry 412 (MoCA channel D5) should be utilized because it has the highest signal-to-noise ratio within MoCA band D. According to other embodiments, the frequency hopping circuit can be configured to examine all of the MoCA bands and their corresponding MoCA channels, and select the MoCA channel having the highest signal-to-noise ratio. According to still further embodiments, the frequency hopping circuit can be required to select the frequency resource from a different MoCA band regardless of the signal-to-noise ratio measured for other MoCA channels within the existing band. This condition is illustrated in FIG. 4. Specifically, the frequency hopping circuit can examine MoCA channels associated with all MoCA bands except band D. Entry 414 corresponds to MoCA channel E3 which has the highest signal-to-noise ratio in the remaining MoCA bands. The frequency hopping circuit would therefore select MoCA channel E3 to maintain the communication link, and supply this information to all other devices. According to an embodiment, rather than selecting specific MoCA channels, the frequency hopping unit can be configured to select the entire MoCA band for the communication link. The table 400 would, for example, be created such that the signal-to-noise ratio values are measured across entire MoCA bands.

Figure 5:
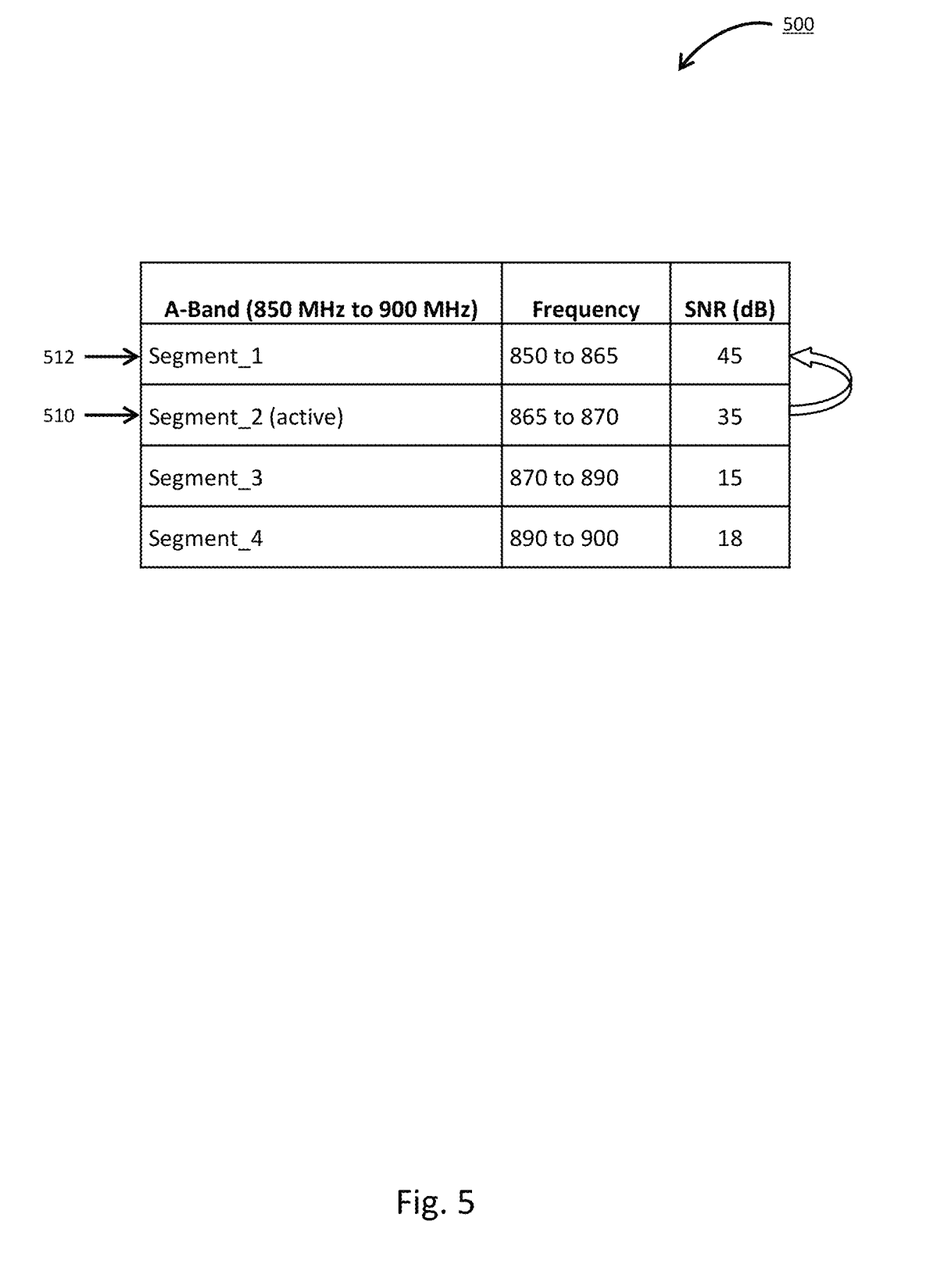
FIG. 5 is a table for illustrating creation of different frequency segments within a communication medium, according to one embodiment.

FIG. 5 illustrates another logging table 500 that can be created by the frequency hopping circuits 230. According to the illustrated embodiment, the frequency hopping circuit divides an individual MoCA band into specific frequency segments that can be used for the communication link. Depending on the specific implementation, the frequency segments can equal or unequal bandwidths. If a transmission medium other than a MoCA cable is being used, any designated frequency bandwidth can be selected and segmented to achieve the same purpose. As illustrated in FIG. 5, the table 500 contains 4 entries which correspond to different segments of MoCA band A. Entry 510 corresponds to the frequency segment currently being used to maintain the communication link. The current signal-to-noise ratio is determined to be 35 dB. It can be seen that entry 512 corresponds to a frequency segment which has a higher signal-to-noise ratio. Accordingly, the frequency hopping circuit would select entry 512 for maintaining the communication link, and supply this information to all other devices in the network. As previously discussed, the frequency hopping circuit can be provided within one, or all, devices associated with the system. Accordingly, each such device would be capable of independently monitoring the communication link and generating a corresponding table. Thus, a device that is experiencing a particularly low signal-to-noise ratio can select a new frequency for maintaining the communication link.

According to at least one embodiment, a threshold level can be established for implementing a frequency hop for the communication link. For example, if a threshold signal-to-noise ratio is set at 20 dB, then only device experiencing a lower signal-to-noise ratio would be allowed to hop to a different frequency. The frequency hopping circuit can, under such circumstances, examine the table 500 and select the best frequency resource for maintaining the communication link. Each device can also have predetermined times when they generate the table 500 in order to avoid unnecessary frequency hops. Furthermore, the table generated by a particular device can be supplied to all other devices so that the most recent table is always utilized.

Figure 6:
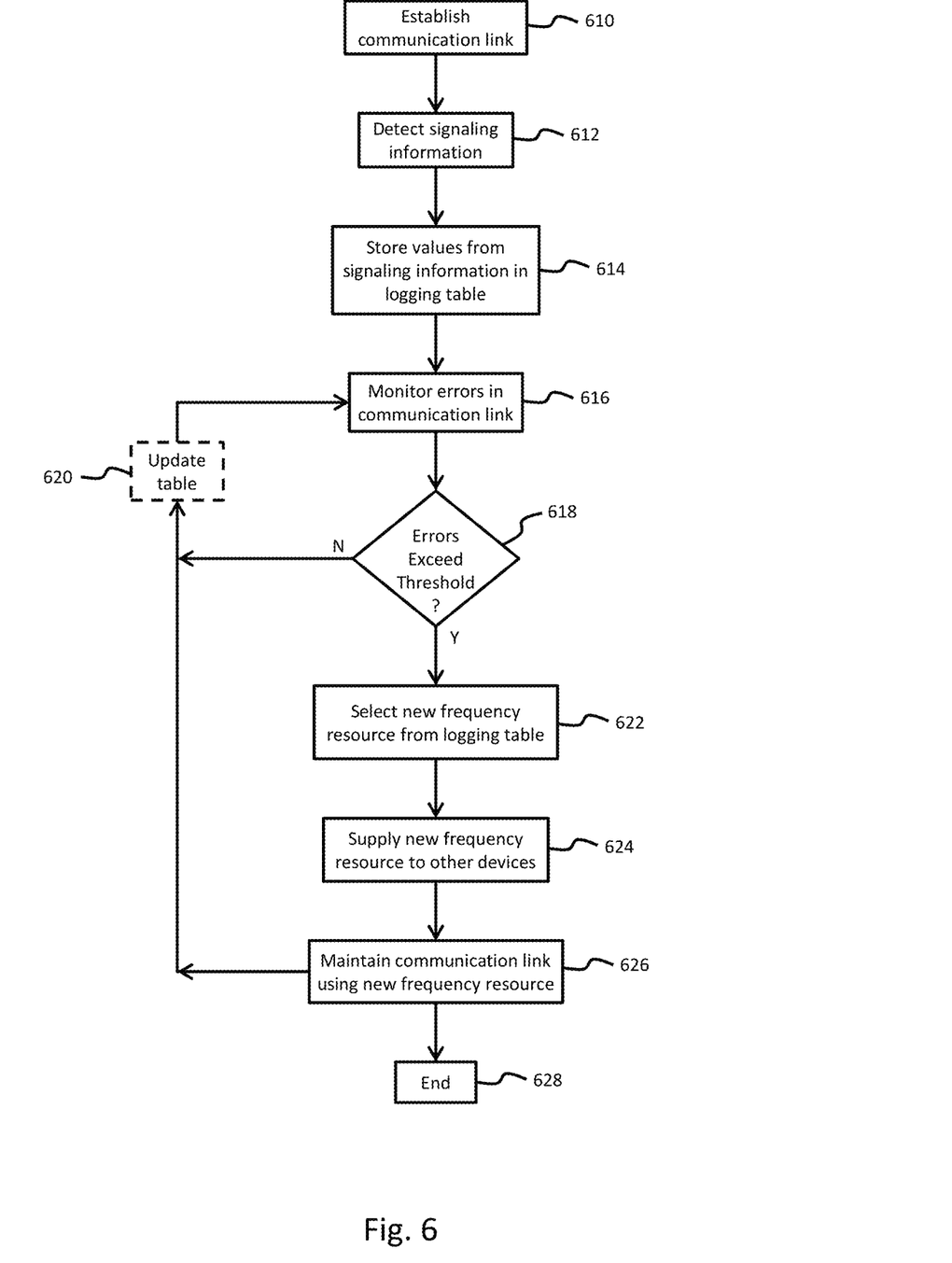
FIG. 6 is a flowchart of a process for frequency hopping, according to one embodiment.

FIG. 6 is a flowchart illustrating a process for frequency hopping, in accordance with at least one embodiment. At 610, a communication link is established. This can correspond, for example, to deployment of a new service at a customer location, and connection of multiple devices within the customer location over an existing communication medium. Various types of physical cables can be used as the communication medium including, but not limited to, standard coaxial cables, IFL cables, etc. As previously discussed, the devices that are interconnected using the communication link each include a frequency hopping circuit. At 612, the frequency hopping circuit monitors the communication medium in order to detect if any signaling information is present. This can correspond, for example, to detecting power levels and/or signal-to-noise levels across the entire frequency bandwidth that is usable for establishing the communication link. At 614, the values corresponding to the detected signaling information are stored in a table. As previously discussed, the table can include information pertaining to specific frequency ranges that are defined for the communication medium, as well as information indicative of signal quality such as a value for the signal-to-noise ratio. At 616, the communication link is monitored in order to detect errors or error levels. Such errors can be based, for example, on signal quality, packet loss levels, bit error rates, etc. At 618, it is determined if the errors or error levels exceed a predetermined threshold level. If the error being monitored, for example, is power level then a minimum threshold power level can be set. Once the detected power level falls below the threshold, the error would be exceeded. If the error being detected is packet loss, the number of packets being received would be monitored in order to determine if any are not received. A percentage of total packets lost (e.g., 10%) can be used as a threshold. Accordingly, if more than 10% of the packets are being lost, the threshold would be exceeded.

If it is determined that the errors do not exceed the preset threshold, control returns to 616, where the communication link continues to be monitored for errors. Optionally, the table can be updated at 620. If the errors exceed the threshold, then at 622, a new frequency resource is selected from the table. For example, the values stored in the table can be examined in order to identify the best frequency resource that should be used to maintain the communication link. At 624, the new frequency resource, or relevant information, is supplied to all other devices utilizing the communication link. At 626, the communication link is maintained between the devices using the newly selected frequency resource. The process then ends at 628. It should be noted, however, that the communication link can be maintained between the devices for extended periods of time. Accordingly, control would typically return to 620 where the table is updated so that the communication link can continue being monitored.

Figure 7A:
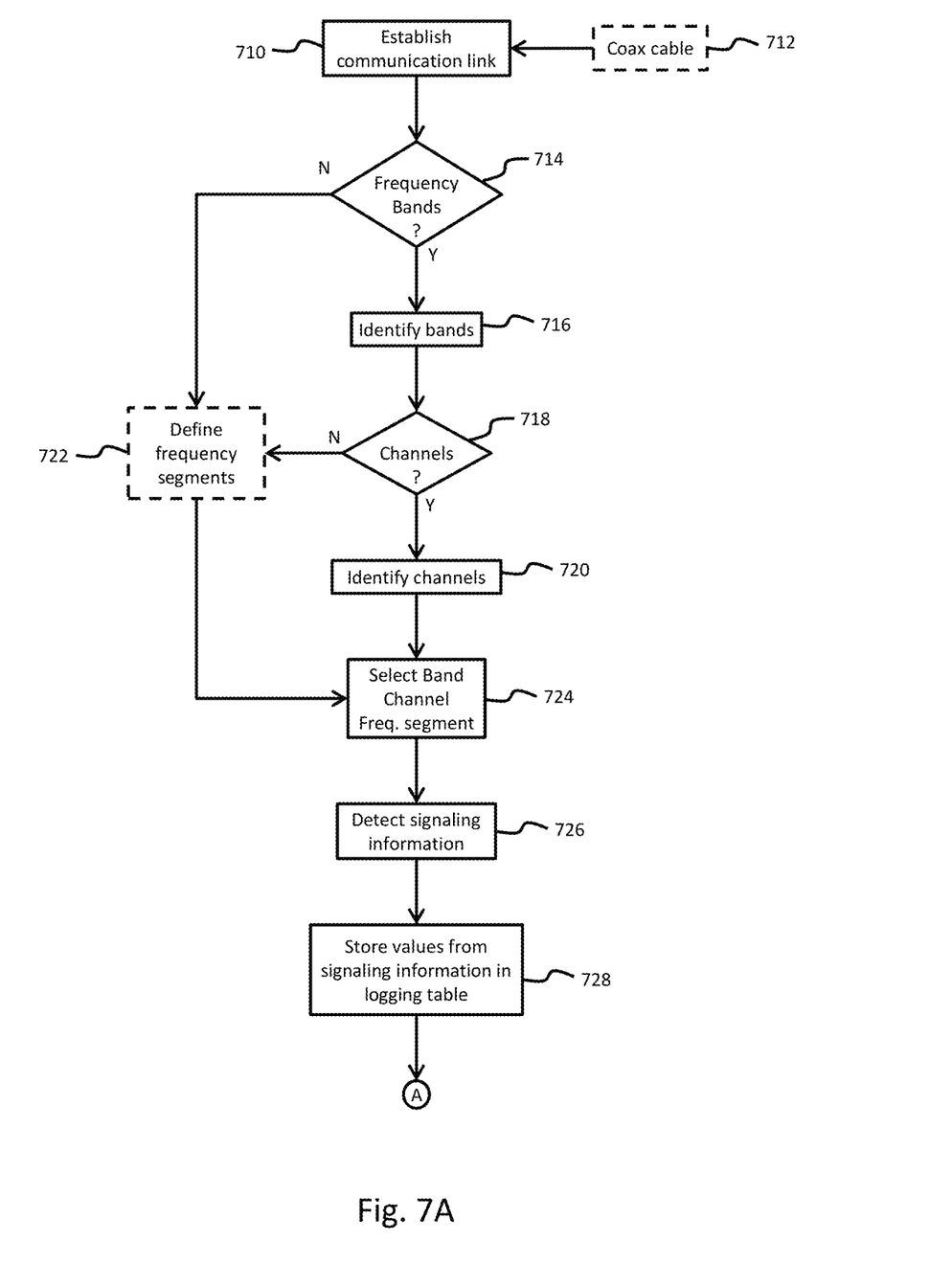
FIGS. 7A and 7B are a flowchart of a process for frequency hopping, according to various embodiments.
Figure 7B:
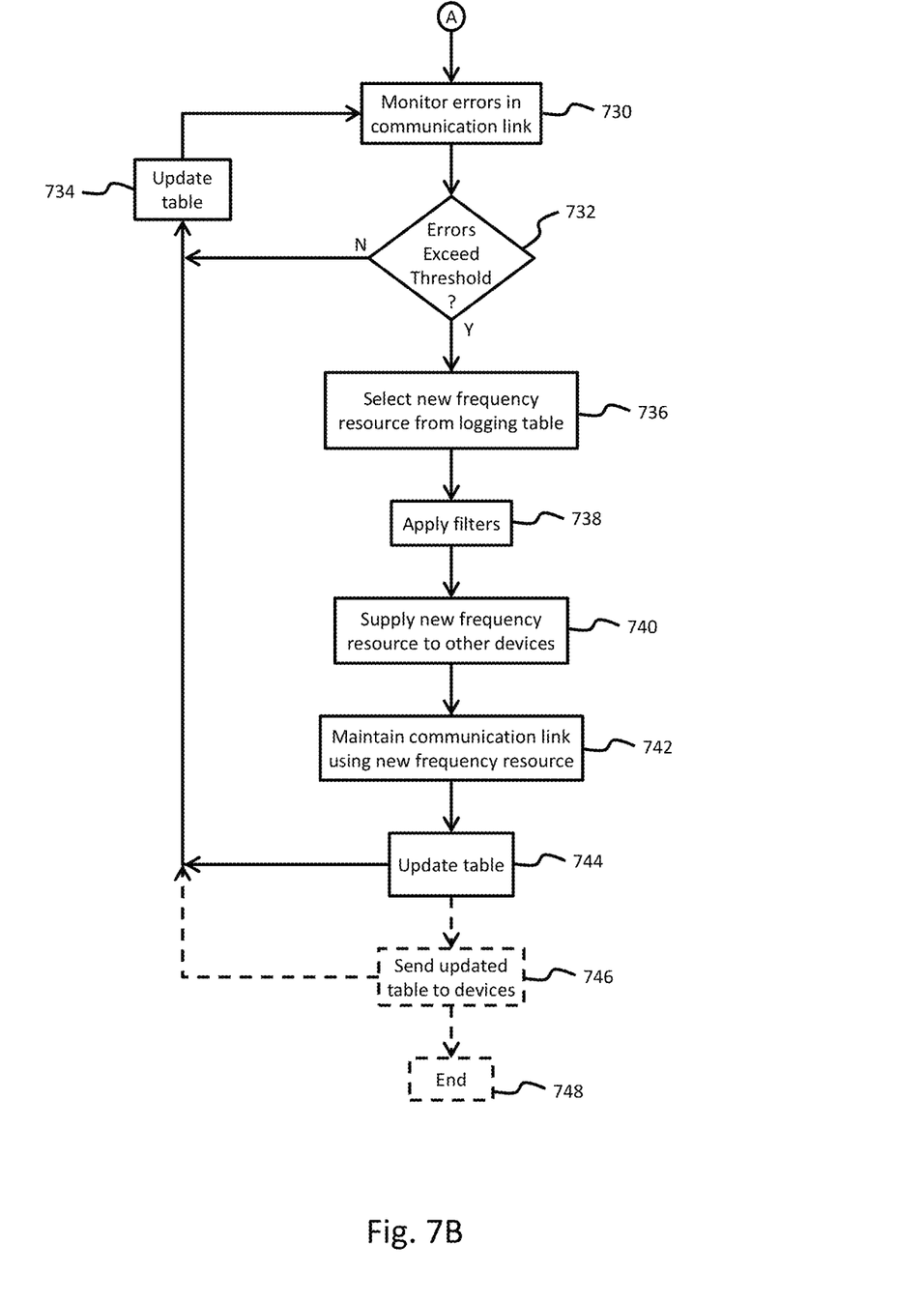

FIG. 7 is a flowchart illustrating the steps for frequency hopping, in accordance with various embodiments. At 710, a communication link is established between multiple devices over a communication medium. According to at least one embodiment, the communication medium can be in the form of a coaxial cable, IFL cable, etc. This is indicated at 712. Furthermore, a default frequency resource can be utilized for establishing the communication link. Depending on the specific service provider, for example, a particular frequency range can be designated as the default frequency resource to be used in all initial system deployments. Thus, the communication link would be established using this particular default frequency resource. At 714, it is determined whether the communication link is being used in accordance with official standards having predefined frequency bands associated therewith. If the communication medium is a coaxial cable, for example, then the frequency bands can correspond to predefined MoCA channels. If a different communication standard is being utilized, then different frequency bands would apply. If it is determined that frequency bands are defined for the communication medium, they are identified at 716.

At 718, it is determined whether any channels are predefined for each of the frequency bands. For example, if MoCA standards are being used, each MoCA band can have multiple MoCA channels defined within the band. If the communication medium does not contain predefined frequency bands or channels, control passes to 722. Control also passes to 722 if it is determined that frequency bands do not exist (at 714). At 722, frequency segments can be defined from the total frequency bandwidth available on the communication medium. The frequency segments can be defined, for example, by the frequency hopping circuit of one of the devices (e.g., a master unit) and shared with other devices utilizing the communication medium. According to at least one embodiment, each of the frequency segments can have the same size. According to other embodiments, the frequency segments can have different sizes. At 724, any bands, channels, or frequency segments that have been identified are selected. At 726, signaling information is detected for each of the identified bands, channels, or frequency segments. At 728, values corresponding to the detected signaling information are stored in the table. These values can include, for example, frequency bands, channels, frequency bandwidths, signal-to-noise ratios, etc.

At 730, the communication link is monitored in order to detect any errors. At 732, the errors are examined to determine if they exceed a predetermined threshold. As previously discussed, this can correspond to power levels falling below a threshold amount, error rates exceeding a threshold amount, packet loss exceeding a predetermined amount, etc. If the detected errors do not exceed the predetermined threshold level, then the table is updated at 734. Control subsequently returns to 730 where the communication link continues to be monitored. If the errors exceed the threshold level, control passes to 736. At 736, a new frequency resource is selected from the logging table. According to an embodiment, this can correspond to selecting MoCA channel D5, from table 400, based on the highest signal-to-noise ratio level. At 738, one or more filters are applied to achieve the change in frequency resource. For example, each device can include multiple filters that can be used individually or in combination to achieve certain frequency ranges for communicating. Alternatively, or in addition to, each device can include one or more variable filters that can be controlled to block and/or enable specific frequency ranges. At 740, information pertaining to the new frequency resource is supplied to other devices in the network. According to an embodiment, this can be achieved by supplying the entry from the table to each device, or providing an index to the entry. According to other embodiments, information pertaining to the specific range of the frequency resource, such as 1150 MHz to 1250 MHz (table 300), can be supplied to the devices.

At 742, the communication link is maintained using the newly selected frequency resource. At 744, the table is updated. For example, the table can be updated to specify the new frequency resource as active for the communication link. Additionally, the table can be updated with real-time signaling information. More particularly, the signaling information would again be detected for the communication medium, and the previous information contained in the table would be updated with the newly detected signaling information. According to at least one embodiment, a copy of the table, or information contained therein, can be supplied to all devices using the communication link. This is indicated at 746. Control would then return to 730 where the communication link continues to be monitored for any errors. Optionally, the process can end at 748.

Figure 8:
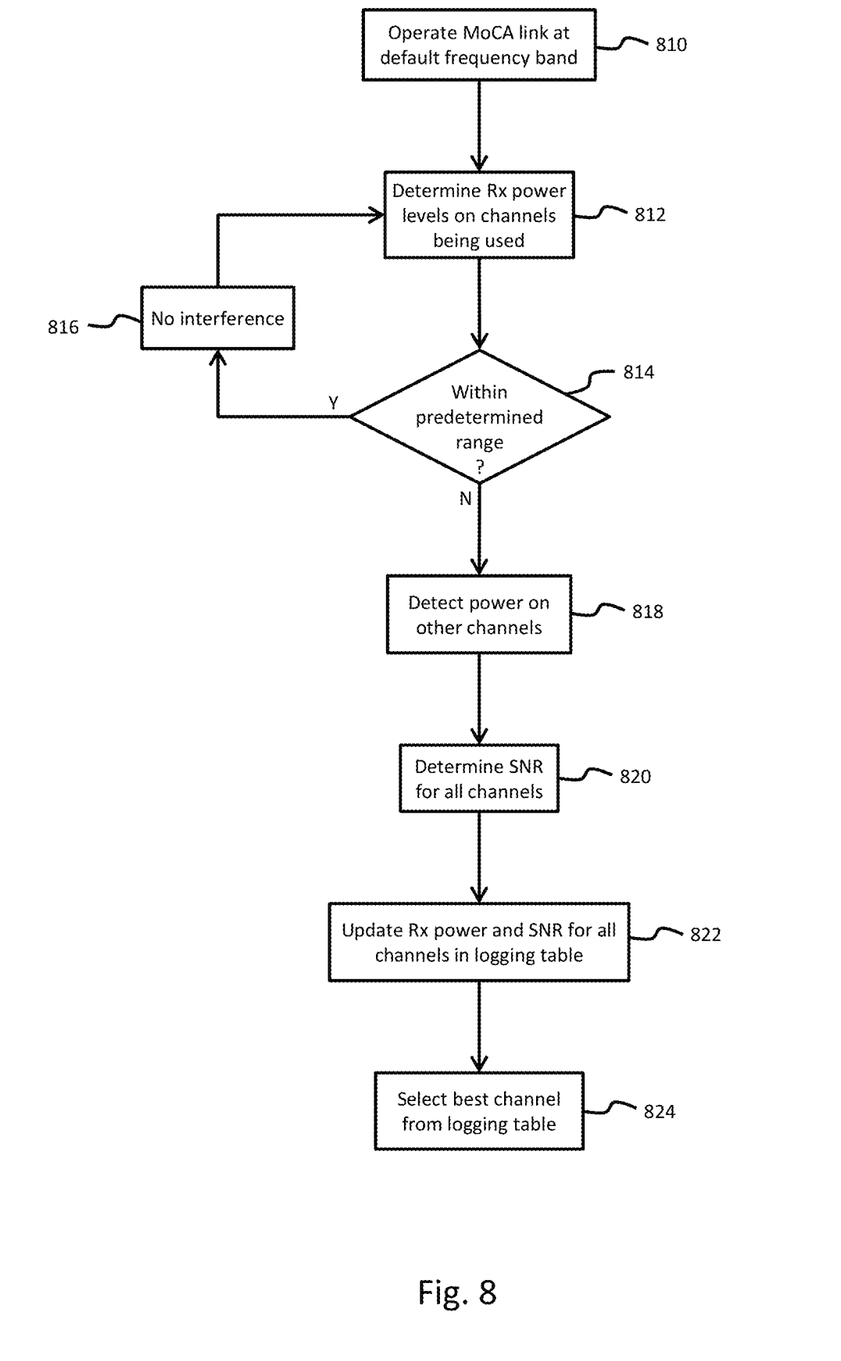
FIG. 8 is a flowchart of a process for frequency hopping, according to at least one embodiment.

FIG. 8 is a flowchart illustrating a process for frequency hopping, according to various embodiments. At 810, the system is deployed and the devices are connected to operate at a default frequency band in compliance with a standard MoCA link. At 812, receive power levels are determined for all channels being used. According to an embodiment, this can correspond to active MoCA channels within the communication link. According to other embodiments, the received power levels can be determined for all defined MoCA channels within the communication link. At 814, it is determined whether the received power levels are within a predetermined range. The predetermined range can be selected, for example, based on system implementation, QoS requirements, etc. If the power levels are within the predetermined range, control passes to 816, where it is concluded that no interference is currently present on the communication link. If the received power levels are not within the predetermined range, then power levels on other channels are detected at 818. At 820, the signal-to-noise ratio is determined for all channels. As previously discussed, these measurements can be taken for all active MoCA channels or all defined MoCA channels. At 822, the table is updated with information pertaining to the received power levels as well as the signal-to-noise ratio for all channels. At 824, the best channel is selected from the table in order to maintain the communication link. More particularly, the best channel can be selected by a particular frequency hopping circuit and supplied to the frequency hopping circuits of all other devices using the communication link.

Various features described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Furthermore, various features can be implemented using algorithms illustrated in the form of flowcharts and accompanying descriptions. Some or all steps associated with such flowcharts can be performed in a sequence independent manner, unless otherwise indicated. Those skilled in the art will also understand that features described in connection with one Figure can be combined with features described in connection with another Figure. Such descriptions are only omitted for purposes of avoiding repetitive description of every possible combination of features that can result from the disclosure.

The terms software, computer software, computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C #, Python, R, Fortran, COBOL, assembly language, markup languages (e.g., HTML, SGML, XML, VoXML), Java, JavaScript, etc. As used herein, the terms processor, microprocessor, digital processor, and CPU are meant generally to include all types of processing devices including, without limitation, single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Such exemplary hardware for implementing the described features are detailed below.

Figure 9:
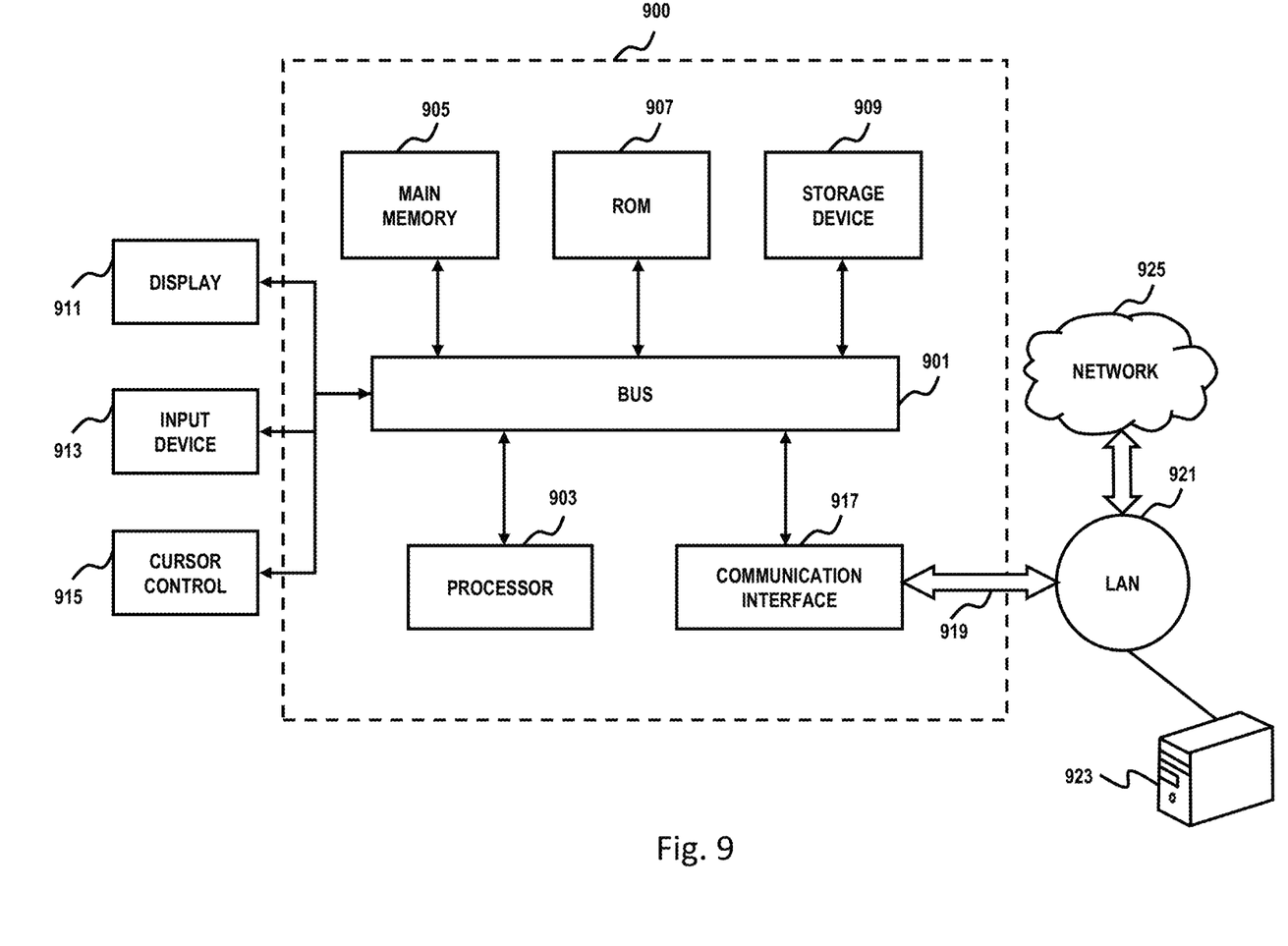
FIG. 9 is a diagram of a computer system that can be used to implement various exemplary features and embodiments.

FIG. 9 is a diagram of a computer system that can be used to implement features of various embodiments. The computer system 900 includes a bus 901 or other communication mechanism for communicating information and a processor 903 coupled to the bus 901 for processing information. The computer system 900 also includes main memory 905, such as a random access memory (RAM), dynamic random access memory (DRAM), synchronous dynamic random access memory (SDRAM), double data rate synchronous dynamic random-access memory (DDR SDRAM), DDR2 SDRAM, DDR3 SDRAM, DDR4 SDRAM, etc., or other dynamic storage device (e.g., flash RAM), coupled to the bus 901 for storing information and instructions to be executed by the processor 903. Main memory 905 can also be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a light emitting diode (LED) or other flat panel displays, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911. Additionally, the display 911 can be touch enabled (i.e., capacitive or resistive) in order facilitate user input via touch or gestures.

According to an exemplary embodiment, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multiprocessing arrangement may also be employed to execute the instructions contained in main memory 905. In alternative embodiments, hard-wired circuitry may be used in place of or in combination with software instructions to implement exemplary embodiments. Thus, exemplary embodiments are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 917 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a High Definition Multimedia Interface (HDMI), etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 such as a wide area network (WAN) or the Internet. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an exemplary embodiment through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Non-volatile media can further include flash drives, USB drives, microSD cards, etc. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 10:
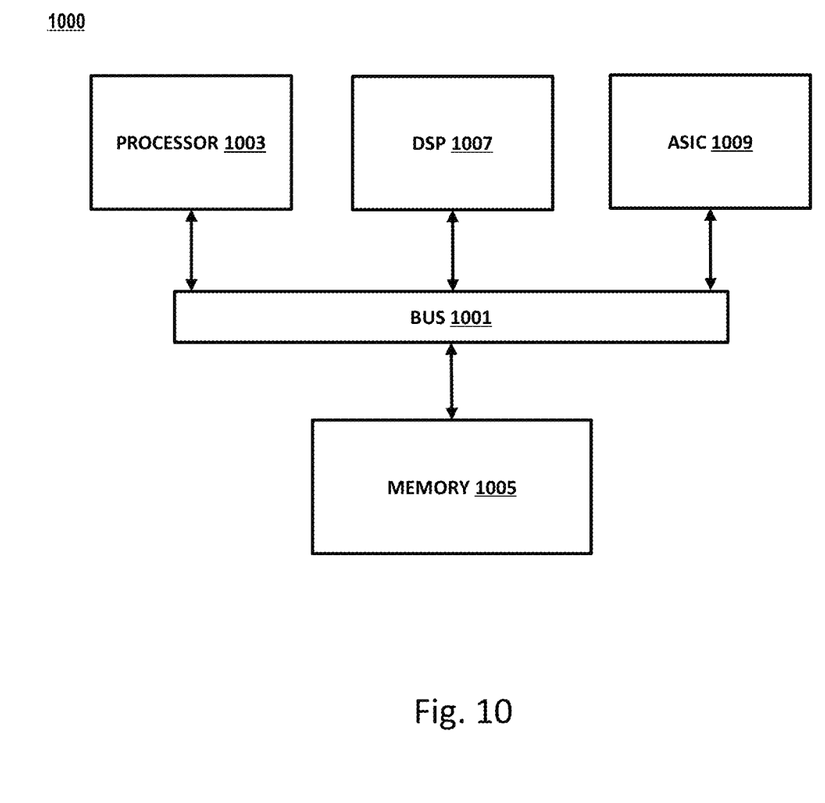
FIG. 10 is a diagram of a chip set that can be used to implement various exemplary features and embodiments.

FIG. 10 illustrates a chip set 1000 upon which features of various embodiments may be implemented. Chip set 1000 is programmed to implement various features as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1000, or a portion thereof, constitutes a means for performing one or more steps of the figures.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein. The memory 1005 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
   establishing a communication link, between a first device and one or more additional devices, over a communication medium using a default frequency resource;
   detecting signaling information for frequency resources available on the communication medium;
   storing values associated with the signaling information as entries within a logging table configured to store, in part, information regarding available resources on the communication medium;
   monitoring errors in the communication link;
   selecting a new frequency resource from the logging table, if the errors exceed a predetermined threshold level;
   supplying the new frequency resource to the one or more additional devices; and
   maintaining the communication link using the new frequency resource.

2. The method of claim 1, further comprising updating the logging table when a new frequency resource is selected for maintaining the communication link.

3. The method of claim 1, further comprising updating the logging table at predetermined intervals.

4. The method of claim 1, further comprising supplying the logging table to the one or more additional devices.

5. The method of claim 1, wherein the communication medium is a coaxial cable.

6. The method of claim 1, wherein selecting a new frequency resource further comprises tuning a variable filter to facilitate communication within the selected frequency resource.

7. The method of claim 1, wherein selecting a new frequency resource further comprises activating one or more filters to facilitate communication within the selected frequency resource.

8. The method of claim 1, wherein the signaling information includes receive power level, signal to noise ratio, or both.

9. The method of claim 8, wherein selecting a new frequency resource comprises selecting an entry from the logging table corresponding to the frequency resource with a highest signal to noise ratio.

10. The method of claim 1, wherein:
    a plurality of frequency bands is defined for the communication medium; and
    each frequency resource is selected from the defined plurality of frequency bands.

11. The method of claim 10, wherein:
    at least one frequency band from the plurality of frequency bands includes two or more frequency channels; and each frequency resource is selected from the defined plurality of frequency bands or the two or more frequency channels within the at least one frequency band.

12. The method of claim 10, further comprising:
dividing each frequency band into one or more frequency segments,
wherein each frequency resource is selected from the defined plurality of frequency bands or the one or more frequency segments.

13. The method of claim 10, wherein:
the communication medium is a coaxial cable; and
the plurality of frequency bands comprises a plurality of MoCA bands.

14. An apparatus comprising:
a memory for storing information, including one or more instructions;
one or more processors for executing the one or more instructions; and
a frequency hopping circuit for:
establishing a communication link, between the apparatus and one or more additional devices, over a communication medium using a default frequency resource;
detecting signaling information for frequency resources available on the communication medium;
storing values associated with the signaling information as entries within a logging table configured to store, in part, information regarding available resources on the communication medium;
monitoring errors in the communication link;
selecting a new frequency resource from the logging table, if the errors exceed a predetermined threshold level;
supplying the new frequency resource to the one or more additional devices; and
maintaining the communication link using the new frequency resource.

15. The apparatus of claim 14, wherein the frequency hopping circuit further updates the logging table when a new frequency resource is selected for maintaining the communication link.

16. The apparatus of claim 14, wherein the frequency hopping circuit further updates the logging table at predetermined intervals.

17. The apparatus of claim 14, wherein the frequency hopping circuit further supplies the logging table to the one or more additional devices.

18. The apparatus of claim 14, wherein the communication medium is a coaxial cable.

19. The apparatus of claim 14, wherein selecting a new frequency resource further comprises tuning a variable filter to facilitate communication within the selected frequency resource.

20. The apparatus of claim 14, wherein selecting a new frequency resource further comprises activating one or more filters to facilitate communication within the selected frequency resource.

* * * * *